United States Patent

[11] 4,047,548
[45] Sept. 13, 1977

Wagner

[54] VAPOR RECOVERY SYSTEM WITH SAFETY VALVE

[75] Inventor: Walter D. Wagner, Chaddsford, Pa.

[73] Assignee: Sun Oil Company of Pennsylvania, Philadelphia, Pa.

[21] Appl. No.: 626,418

[22] Filed: Oct. 28, 1975

[51] Int. Cl.² .............................................. B65B 3/04
[52] U.S. Cl. ..................................... 141/52; 141/59; 141/302; 137/68 R; 220/89 A
[58] Field of Search ............. 141/208, 59, 200, 37–64, 141/285–310, 392; 137/68 R, 71; 220/89 A

[56] References Cited

U.S. PATENT DOCUMENTS

| | | | |
|---|---|---|---|
| 2,765,801 | 10/1956 | Selim | 137/71 |
| 3,826,291 | 7/1974 | Steffens | 141/59 |

*Primary Examiner*—Houston S. Bell, Jr.
*Attorney, Agent, or Firm*—J. Edward Hess; Donald R. Johnson

[57] ABSTRACT

A safety arrangement for a gasoline dispensing station equipped with a vapor recovery system. Gasoline vapors displaced from a motor vehicle fuel tank during filling are collected through the dispensing nozzle, and are directed first through a flexible hose attached to the nozzle and then through a pipe to an underground storage system. A break-away valve is placed in the pipe near where it enters the ground such that in the event of an accident, as by an automobile running over the gasoline dispensing console, the break-away valve will automatically close to shut off the vapor recovery system. This minimizes the danger of an explosion or fire possibly caused by an open vapor recovery system.

2 Claims, 3 Drawing Figures

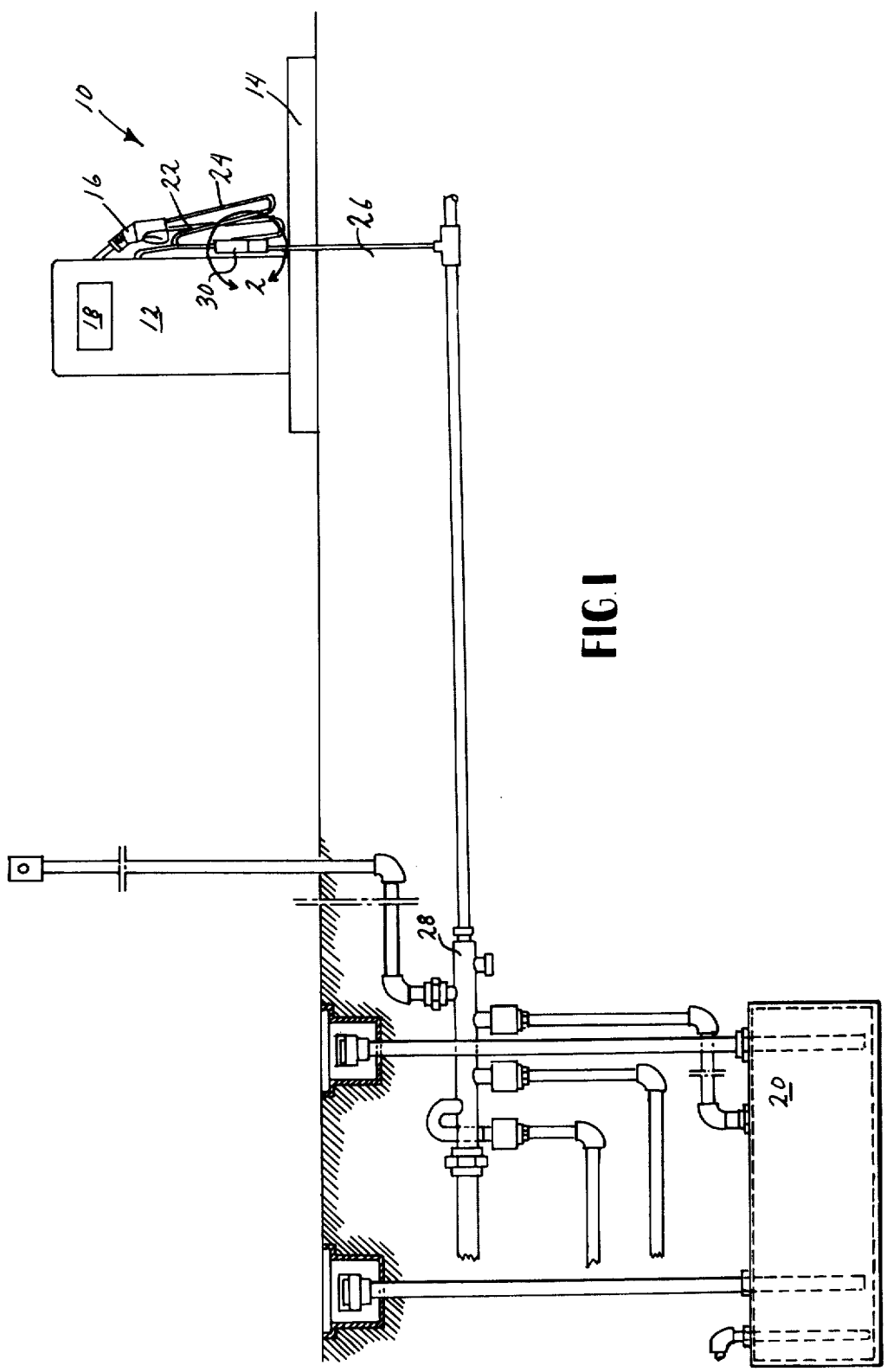

VAPOR RECOVERY SYSTEM WITH SAFETY VALVE

BACKGROUND OF THE INVENTION

Environmental Protection Agency regulations which have recently been promulgated require gasoline stations in some areas to be fitted with vapor recovery equipment. These regulations typically require the recovery of gasoline vapors previously vented to the atmosphere during two different operations. First, the regulations require the recovery of gasoline vapors displaced from an underground storage tank during filling of the tank by a drop from a tank truck. Secondly, the regulations require the recovery of gasoline vapors displaced during filling of the storage tank of a motor vehicle. A vapor recovery system designed to meet both requirements is disclosed in VAPOR RECOVERY SYSTEM FOR SERVICE STATIONS, patent application Ser. No. 538,057, filed Jan. 2, 1975, now U.S. pat. No. 3,915,205. In that system, vapors displaced from a motor vehicle fuel tank during filling are directed through an underground manifold back to the underground storage tanks. The vapors are directed to the manifold by an underground pipe which enters the ground at the gasoline dispensing console.

Although many potential dangers of this system have been recognized, one dangerous aspect which thus far has been unrecognized is the inherent danger of an open vapor recovery system in an accident wherein the dispensing console is knocked over, as by an errant automobile, and the vapor recovery pipe is severed open. An open vapor recovery system, especially during the occurence of an accident, could present a dangerous opportunity for a fire or explosion.

SUMMARY OF THE INVENTION

In accordance with a preferred embodiment, a system is disclosed for dispensing hydrocarbons which has a vapor recovery system for directing hydrocarbon vapors displaced during the dispensing operation to an underground storage facility. The system is especially designed to minimize the danger from fire or explosion in the event of an accident. The hydrocarbon dispensing system includes a dispensing nozzle having a vapor recovery passageway for picking up gasoline vapors and then transporting them via a pipe to the underground storage facility. A valve is placed in the pipe near where it enters the ground for automatically sealing off the vapor recovery system in the event the pipe is accidentally damaged to minimize the danger of fire or explosion possibly caused by an open vapor recovery system. A better understanding of the invention and its advantages may be had by the following explanation of one particular embodiment shown in the drawings.

BRIEF DESCRIPTION OF THE DRAWINGS

FIG. 1 illustrates an overall arrangement for a vapor recovery system constructed in accordance with the teachings of the present invention.

DETAILED DESCRIPTION OF AN EMBODIMENT

Figure 3:
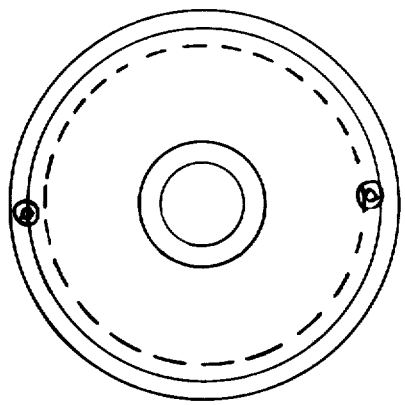
FIG. 3 is a top view of the valve shown in FIG. 2.

Referring to FIG. 1, there is illustrated an overall arrangement of a vapor recovery system constructed in accordance with the teachings of the present invention. The overall operation of this system is disclosed in detail in U.S. patent application Ser. No. 538,057, filed Jan. 2, 1975 for VAPOR RECOVERY SYSTEM FOR SERVICE STATIONS now U.S. Pat. No. 3,915,205. An island 10 of a typical service station has a dispensing console 12 positioned on a low pedestal 14. The console 12 supports a dispensing nozzle 16, and has typical registers 18 for displaying the quantity of gasoline pumped, the price per gallon (or liter), and the purchase price of the dispensed gasoline. The dispensing nozzle 16 is especially adapted for vapor recovery, and may be the type illustrated in patent application Ser. No. 609,760, filed Sept. 2, 1975. Gasoline being dispensed is pumped from an underground storage tank, such as the one illustrated at 20, to the dispensing console and then through a flexible hose 22 to the dispensing nozzle 18. Gasoline vapors displaced from the motor vehicle tank are picked up by the nozzle and are directed through a flexible hose 24 to a pipe 26 to an underground manifold 28, and finally back to the underground storage tanks.

In accordance with the teachings of the present invention, a break-away valve 30 is positioned in the pipe 26 near where it enters the ground. The purpose of the valve is to automatically seal off the vapor recovery system in the event of an accident, as by an errant automobile running over the gasoline dispensing island, to minimize the danger of fire or explosion possibly caused by an open vapor recovery system.

Figure 2:
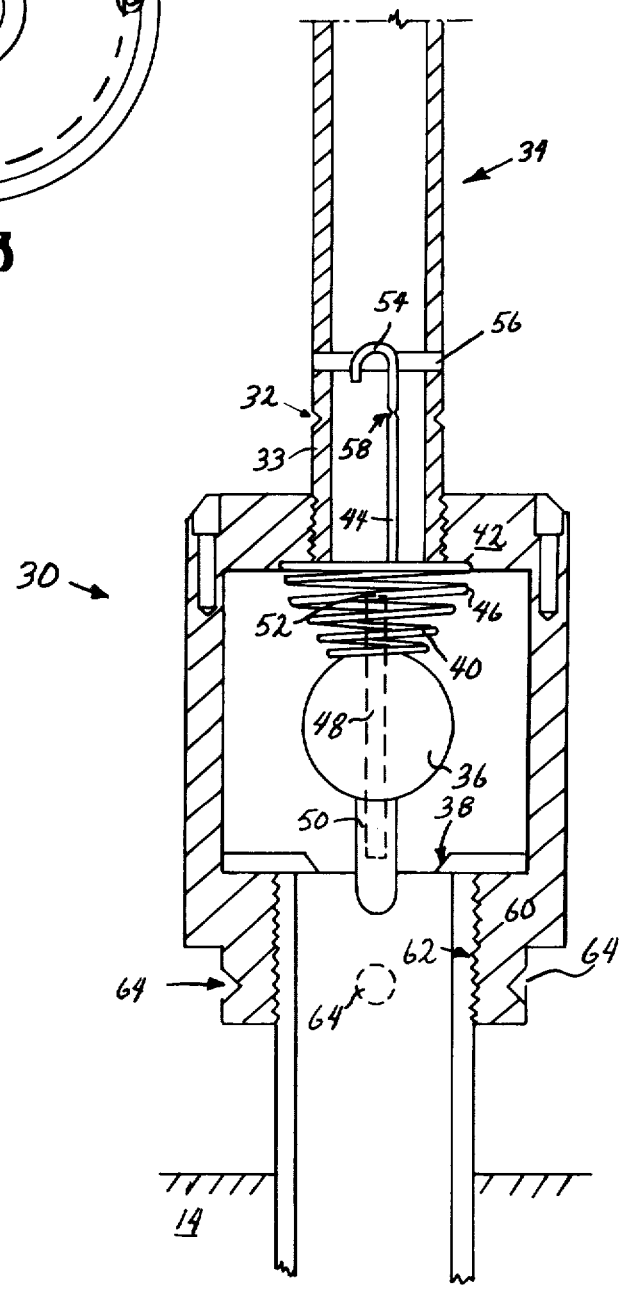
FIG. 2 is a partially cross-sectioned view of the break-away valve shown in FIG. 1.

FIG. 2 is a partially cross-sectioned view of the break-away valve shown in FIG. 1. The valve has a round cross sectional shape as shown clearly by FIG. 3. A weakened portion 32 extends fully around the circumference of a pipe 33, and separates a break-away section 34 from the remaining structure of the valve. The valve includes a ball 36 which is adapted to seat against a valve seat 38 when the valve is closed. When the valve is fully open, a spring 40 is compressed between an upper portion 42 of the valve housing and the ball 36. A break-away pin 44 extends between a hole 46 in an element 48 which runs through the ball and attaches to a lower guide element 50. The break-away pin includes a first U-shaped section 52 which extends through the hole 46 and a second U-shaped section 54. The second U-shaped section 54 is positioned around a pin 56 which extends across the upper break-away section 34. In operation, if an automobile were to run over the valve 30, the break-away section 34 would sever from the remainder of the valve along the weakened portion 32, and the pin 44 would sever along its weakened portion 58, thereby allowing the compressed spring 40 to urge the ball 36 into sealing contact with the valve seat 38. This closes the valve, and seals off the vapor recovery system to minimize the dange of a fire or explosion from gasoline vapors in the recovery system. The guide pin 50 ensures that the spring 40 urges the ball 36 into aligned contact with the seat 38 when the pin 44 severs. The lower portion of the valve housing 60 includes a threaded portion 62 which is adapted to be coupled to the pipe 26 near the surface of the pedestal 14. In practice, the break-away valve may be positioned either at or slightly above or below the top surface of the pedestal 14. In the embodiment shown in FIG. 1 the valve is positioned slightly above the top surface of the pedestal. The lower portion 60 of the valve housing has a plurality of indentations 64 which are adapted to receive a spanner wrench during installation of the valve.

In one designed embodiment, the break-away section 34 was constructed of one half inch diameter aluminum pie, and the valve housing 42-60, valve seat 38, and break-away pin 44 were all made of aluminum. The smallest diameter of the valve seat was chosen to be three quarter inches, and the outside diameter of the valve housing was chosen to be two and one half inches.

Different types of break-away valves have been known in the prior art. One such break-away valve is illustrated in U.S. Pat. No. 3,489,160. These prior art valves are typically placed in a gasoline supply line in a service station such that if the dispensing console is knocked over by an errant motor vehicle, liquid gasoline will not be spilled all over the service station. Spilled liquid gasoline during such an accident presents a danger problem which is recognized by the prior art. However, no one has recognized that a similar, but perhaps less dangerous, problem exists for vapor recovery systems.

Although one embodiment of a break-away valve has been illustrated, other types of break-away valves might also be utilized.

The invention claimed is:

1. A system for dispensing hydrocarbons, and having a hydrocarbon vapor recovery system to prevent hydrocarbons displaced from a storage tank in a motor vehicle from being vented into the atmosphere, and designed to minimize the danger from fire or explosion in the event of an accident and comprising:
   a. an underground facility for storing hydrocarbons displaced from a storage tank in a motor vehicle when the storage tank is being filled with liquid hydrocarbons;
   b. a hydrocarbon dispensing station including a dispensing nozzle having a vapor recovery passageway for transporting hydrocarbon vapors displaced from a storage tank in a motor vehicle;
   c. means for transporting hydrocarbon vapors picked up by said dispensing nozzle to said hydrocarbon storage facility and including a pipe extending above ground at said hydrocarbon dispensing station and designed to transport vapors from the nozzle to said hydrocarbon vapor storage facility, and a valve means disposed in said pipe near the surface of the ground for sealing off the vapor recovery system in the event the pipe is accidentally damaged, whereby the sealing off of said pipe in the event of an accident minimizes the dangers of fire or explosion possibly caused by an open hydrocarbon storage system in the event of an accident.

2. A system as set forth in claim 1 wherein said valve means includes a break-away valve means having a weakened portion along which the valve is designed to sever in the event of damage, and a trigger mechanism disposed by said weakened portion for closing the valve in the event of damage.

* * * * *